(12) United States Patent
Finstad, III et al.

(10) Patent No.: US 8,764,031 B2
(45) Date of Patent: Jul. 1, 2014

(54) CABINET WITH ADJUSTABLE SHELF

(75) Inventors: Clemance Bernard Finstad, III, Goodhue, MN (US); Merle Arvid Larson, Cannon Falls, MN (US); Michael Piontek, Chicago, IL (US)

(73) Assignee: Cannon Equipment Company, Rosemount, MN (US)

( * ) Notice: Subject to any disclaimer, the term of this patent is extended or adjusted under 35 U.S.C. 154(b) by 352 days.

(21) Appl. No.: 12/930,556

(22) Filed: Jan. 10, 2011

(65) Prior Publication Data

US 2011/0204760 A1 Aug. 25, 2011

Related U.S. Application Data

(60) Provisional application No. 61/335,777, filed on Jan. 11, 2010.

(51) Int. Cl.
*A47B 57/06* (2006.01)

(52) U.S. Cl.
USPC ....... 280/47.35; 280/79.3; 312/311; 248/250; 211/187

(58) Field of Classification Search
USPC ................. 312/294, 298, 307, 311, 312, 313, 312/317.1, 306, 322, 323, 408; 108/144.11, 108/147.16; 280/47.35, 79.3, 638, 35; 248/235, 241, 250; 211/187, 186, 190, 211/207, 208, 175, 189
See application file for complete search history.

(56) References Cited

U.S. PATENT DOCUMENTS

| | | | |
|---|---|---|---|
| 206,378 A | 7/1878 | Wilber | |
| 333,760 A * | 1/1886 | Larson | 312/307 |
| 614,666 A | 11/1898 | Petry | |
| 668,038 A | 2/1901 | Duhamel | |
| 946,337 A * | 1/1910 | Clear | 312/136 |
| 1,188,792 A | 6/1916 | Kormendy | |
| 2,689,157 A | 9/1954 | Di Censo | |
| 2,946,638 A | 7/1960 | Cob | |
| 3,220,364 A * | 11/1965 | Sandin | 108/147.16 |
| 3,272,528 A * | 9/1966 | Young et al. | 280/33.996 |
| 3,516,639 A | 6/1970 | Bidak et al. | |
| 3,953,044 A * | 4/1976 | Wilson | 280/33.996 |
| 4,379,429 A | 4/1983 | Gubbe et al. | |
| 4,850,604 A * | 7/1989 | Le Marchand et al. | 280/33.996 |
| 4,934,645 A * | 6/1990 | Breslow | 248/242 |
| 5,365,860 A * | 11/1994 | Billington, III | 108/108 |
| 5,483,902 A * | 1/1996 | Grosch | 108/143 |
| 6,234,328 B1 * | 5/2001 | Mason | 211/90.02 |
| 7,121,104 B2 * | 10/2006 | Howington et al. | 62/256 |
| 7,476,186 B1 * | 1/2009 | Steffee | 482/137 |
| 8,267,261 B2 * | 9/2012 | Vanderhoek et al. | 211/150 |

* cited by examiner

Primary Examiner — John Walters
Assistant Examiner — Brian Swenson
(74) Attorney, Agent, or Firm — Pyle & Piontek, LLC

(57) ABSTRACT

A cabinet having a deep shelf with limited access is described and includes at least two opposite sides carrying track means to permit easy adjustment of the shelf between two or more levels by a single person maneuvering only the one accessible end of the shelf. The cabinet can be mounted on wheels to form a cart. One or more such adjustable shelves can be provided. The shelves may be positioned just above the bottom of the cart to provide a maximum depth cart for use, in intermediate positions for use with smaller objects and/or at the very top and/or side of the cart and locked in position to provide a secured interior for the cabinet.

35 Claims, 18 Drawing Sheets

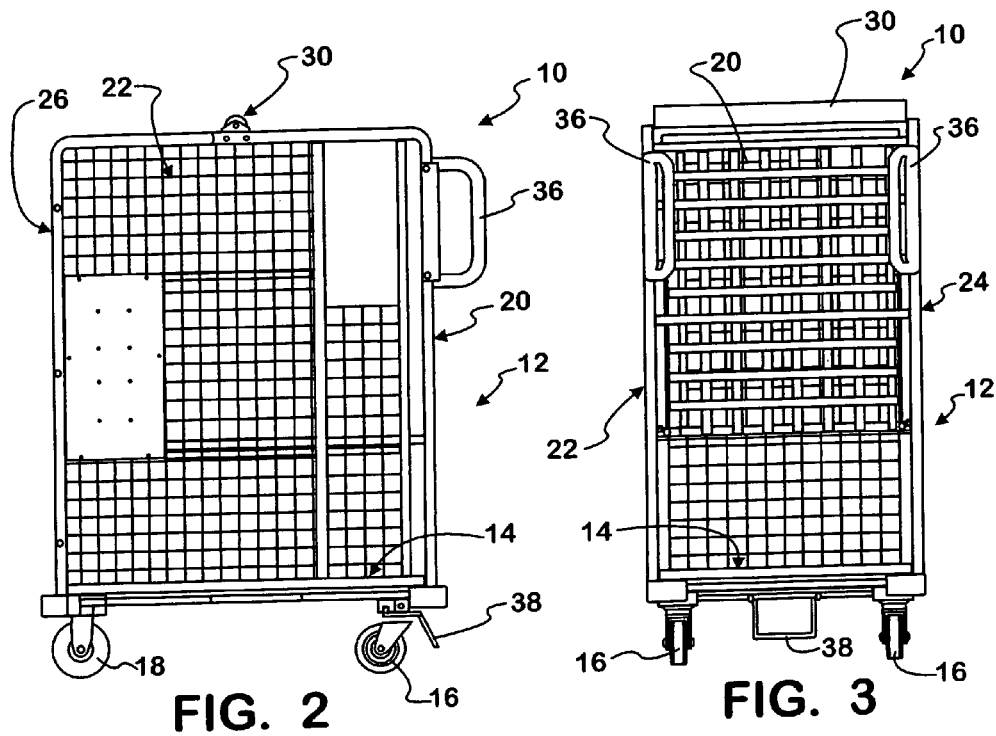
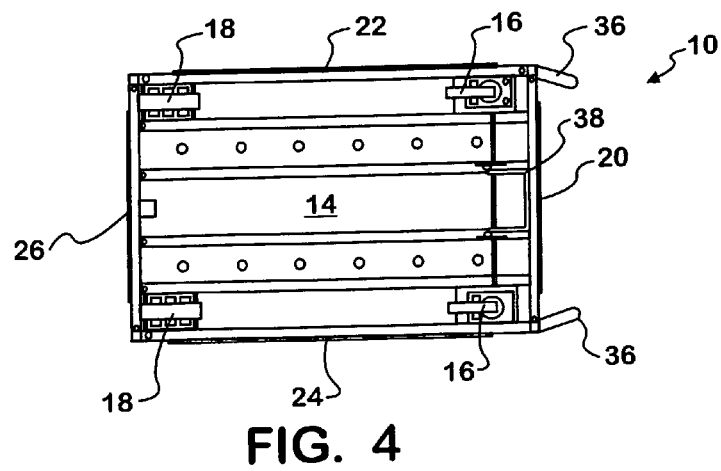

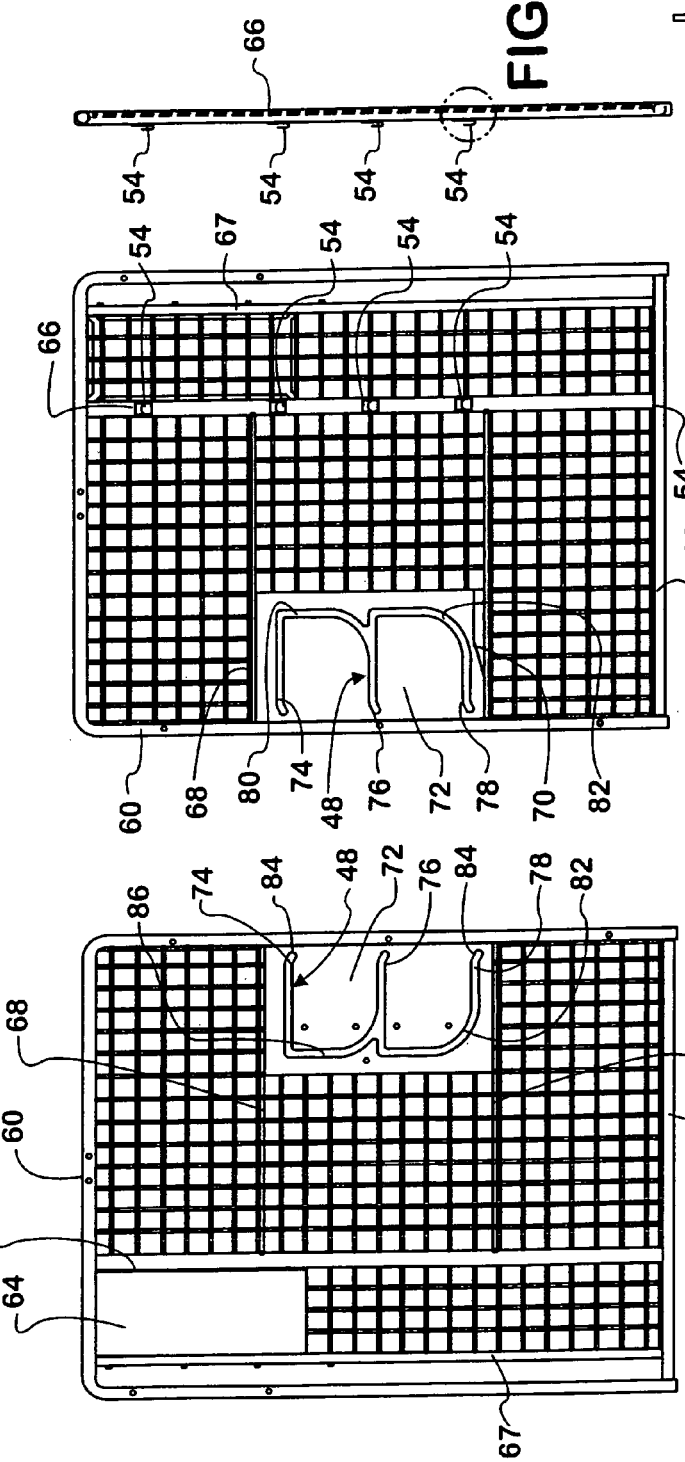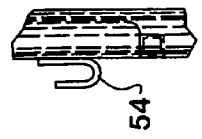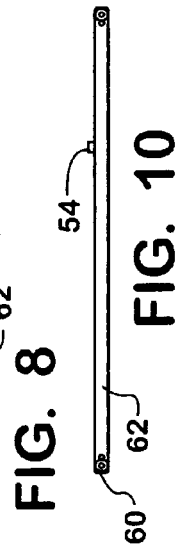

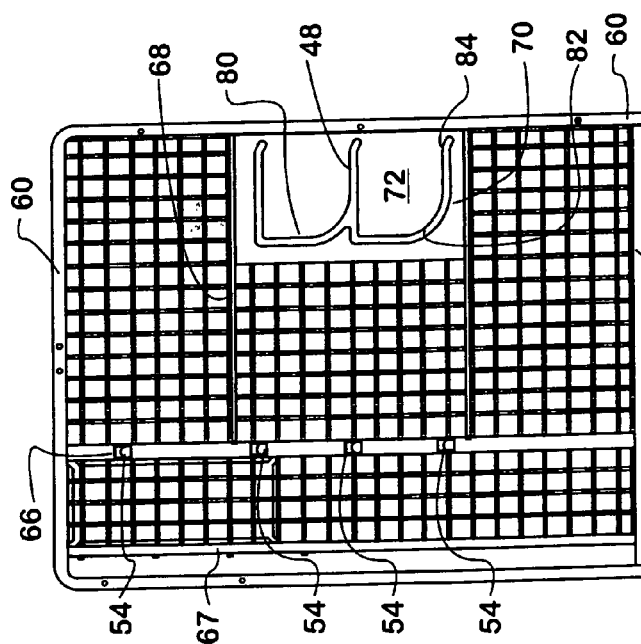

CABINET WITH ADJUSTABLE SHELF

DISCLOSURE

This is a U.S. Non-Provisional Patent Application which is entitled to the priority, benefits of, and the filing date of U.S. Provisional Patent Application Ser. No. 61/335,777, filed on Jan. 11, 2010 and entitled IMPROVED CABINET WITH ADJUSTABLE SHELF, which is incorporated herein by reference, to which some additional disclosure has been added, and relates to a cabinet or container, which can be in the form of a cart, with an adjustable shelf, and particularly to a deep container or cabinet and/or cart with limited access and having a shelf easily adjustable by one person.

BACKGROUND OF THE INVENTION

Cabinets have been provided, frequently with shelves therein. In a cabinet with limited access, say only from one or even two of say the four sides, it can be difficult to adjust a shelf therein, particularly if the shelf is of considerable depth, say of a couple feet and/or near or greater than the arm's length of the person adjusting the shelf. Where access is not limited, it might be possible for a person or persons to grab both ends of the shelf to adjust the same. However, where there is less access, such double ended grip may not be possible. As the depth of the cabinet becomes greater, the shelf adjustment becomes more difficult.

SUMMARY OF THE INVENTION

The disadvantage of the container, cabinet and/or cart construction mentioned above is overcome by the improved cabinet construction of the present invention.

In the present invention, means and methods are provided to adjust a shelf or shelves in a cabinet of even limited access, say only one end, say the front or rear end, enclosed by three sides, top and bottom, and of considerable depth at or beyond an average arm length, say from two feet to four feet and even as large as six feet deep. For example, the shelf could be several feet wide and nearly three feet deep (say for example 24 inches in width by 34 inches in length). The cabinet of the present invention comprises, a bottom, a top, at least two or more sides and one or more shelves therein. The top and bottom are opposite each other. The bottom carries the two or more sides which are opposite each other, and are adjacent an access opening at the front or rear side of the cart. Optionally, a third side could be provided between the two far ends of the two sides, and optionally one or more doors could be provided on the front or fourth side, between the other or near end of the two sides and opposite the third side, closing the access opening. Optionally, the cabinet could be mounted on wheels to form a readily movable cart.

Each of the one or more shelves is provided with means to keep or hold it at the accessible, near or close end of the cabinet, and track means on the two sides which cooperate with the inaccessible, far or other end of the one or more shelves to hold the one or more shelves at various vertical heights in the cabinet. The track means provide a means to hold the far end of the shelf and also to guide the movement of the inaccessible or far end of the shelf when it is moved and adjusted in vertical position. The tracks could be formed by laser or other cut steel plates. The cooperating means on the shelves would include rod ends, rollers or wheels that engage in and travel on the cooperating adjacent tracks. The rollers could be mounted near or adjacent the far shelf ends. The tracks are generally mounted vertically and formed in, on or attached to each of the two sides toward or at the far or inaccessible ends. To get the shelf or shelves onto the tracks, it or they may be cocked or tipped (high on one side, low on the other) so that the cooperating ends can then be set onto or into the tracks. When the shelves are leveled, some part near or adjacent the ends is now engaged in and retained in or on the tracks. The tracks provide at least two different vertical levels, and preferably three or more different vertical levels for each of the shelf or shelves. The means to hold the near end and tracks may provide low, middle and top positions. A single position may alternately receive more than one shelf at different times. For example, the intermediate or middle position may receive the lower of two shelves or the higher of two shelves to have: (1) shelves in the low and intermediate positions with none in the top position, (2) shelves in the intermediate and top position with none in the low position, or (3) shelves in the low and top position with none in the intermediate or middle position.

With the present invention, a single person can easily adjust the vertical height or position of the shelf. To adjust the shelf the person grasps the shelf and maneuvers it so that it is free of the supports at the close or accessible end, as by pulling the shelf up and toward her/him to also move the cooperating ends in the side tracks and then maneuvers the shelf and its far end to a higher or lower position on the two side tracks to a new vertical position, as desired. The tracks have, preferably, relatively lower portions at each of its levels to retain the shelf or shelves by gravity in the selected position.

The cabinet can be of any construction, as can be the shelf. Here the cabinet is illustrated (and not by way of limitation) as made with a tubular frame of about ¾ inch to 1¼ inch, with preferably about a 1 inch diameter, with mainly wire mesh sides with a shelf or shelves of similar construction. Where a tubular frame is used to form a strong shelf, heavy rod or wire portions (about ⅛ to ¼ inches in size) could be used on the perimeter of the sides to form the portions carrying or supporting the shelf in the cabinet, and also guide means or portions could be provided for helping in maneuvering of the shelf to new positions. The means holding the adjacent, accessible or close end could be fixed to the near sides, say in the form of a plurality of hooks welded to the sides of the cabinet or could be made removably attached to and from the cabinet sides. In the former case, the shelf, support and guide portions would be provided with a clearance or notch portion to clear any means for holding such as, say the set of fixed hooks, when the shelf is maneuvered to another level or position. In the latter, alternative construction, the two adjacent supports could be removed from the sides, the shelf or shelves maneuvered and then the adjacent end supports put back in place to hold the close end of the shelf or shelves. While the tubular construction shown is round, it could be square or rectangular and of an equivalent strength cross section as the round tubing shown. Two (one on each side) of the opposed plurality of side hooks can also be used as fulcrums, to help lever or maneuver the shelf into a different position. If multiple positions are provided, more than one set of opposed hooks could carry out this fulcrum function for various movements of the shelf from one level to another.

If desired, other elements than the hooks could be provided as maneuvering fulcrums, and if desired these fulcrum elements could be made removable. If desired, the present invention could be constructed to permit complete removal of the shelf or shelves from the cabinet, or only to permit movement from one vertical level or position to another in the cabinet, with the shelf or shelves normally being captive in the cabinet. The tubular wire construction of the cabinet and shelf or shelves and the guides shown, could be constructed to accomplish either this removable or captive feature. The use of the tracks and fulcrum, be they the hooks or other elements, allow shelf movement that is ergonomically friendly and uses manageable effort in changing the shelf position.

As discussed, the cabinet could be mounted on two or more, and preferably three or four, wheels to permit its movement, and of, say, a larger size of about 2 inches diameter or greater to function as a cart.

Of course cabinets and shelves could be constructed of other materials, and could still utilize the present invention. The invention is illustrated by way of example, and not limitation, in the following description and accompanying drawings.

The shelves can also be positioned just above the bottom of the cabinet to provide near full height utilization of the cabinet or placed in a higher position.

One or more shelves could be positioned at the top of the cart to close the same to form a more secure cabinet. Further a shelf can be positioned adjacent an open front side to also close the same to form a more secure cabinet. Where two such shelves are provided, one can close the top and another close the front with the shelves locked in place to provide an even more secure cabinet.

BRIEF DESCRIPTION OF THE DRAWINGS

FIGS. 2, 3 and 4 are right side, front elevation, and bottom views of the cabinet and shelf construction shown in FIG. 1.

FIG. 8 is an inside, elevational view of the inside of the left side component of the cabinet or cart shown in FIG. 1.

FIG. 9 is a view similar to FIG. 8, but of the outside thereof.

FIGS. 10 to 15 are details of the side shown in FIGS. 8 and 9.

FIG. 16 is an inside elevational view of the right side component of the cabinet or cart shown in FIG. 1.

FIG. 17 is a view similar to FIG. 16, but of the outside thereof.

FIGS. 18 to 23 are details of the side shown in FIGS. 16 and 17.

DESCRIPTION OF THE PREFERRED EMBODIMENT

Figure 1:
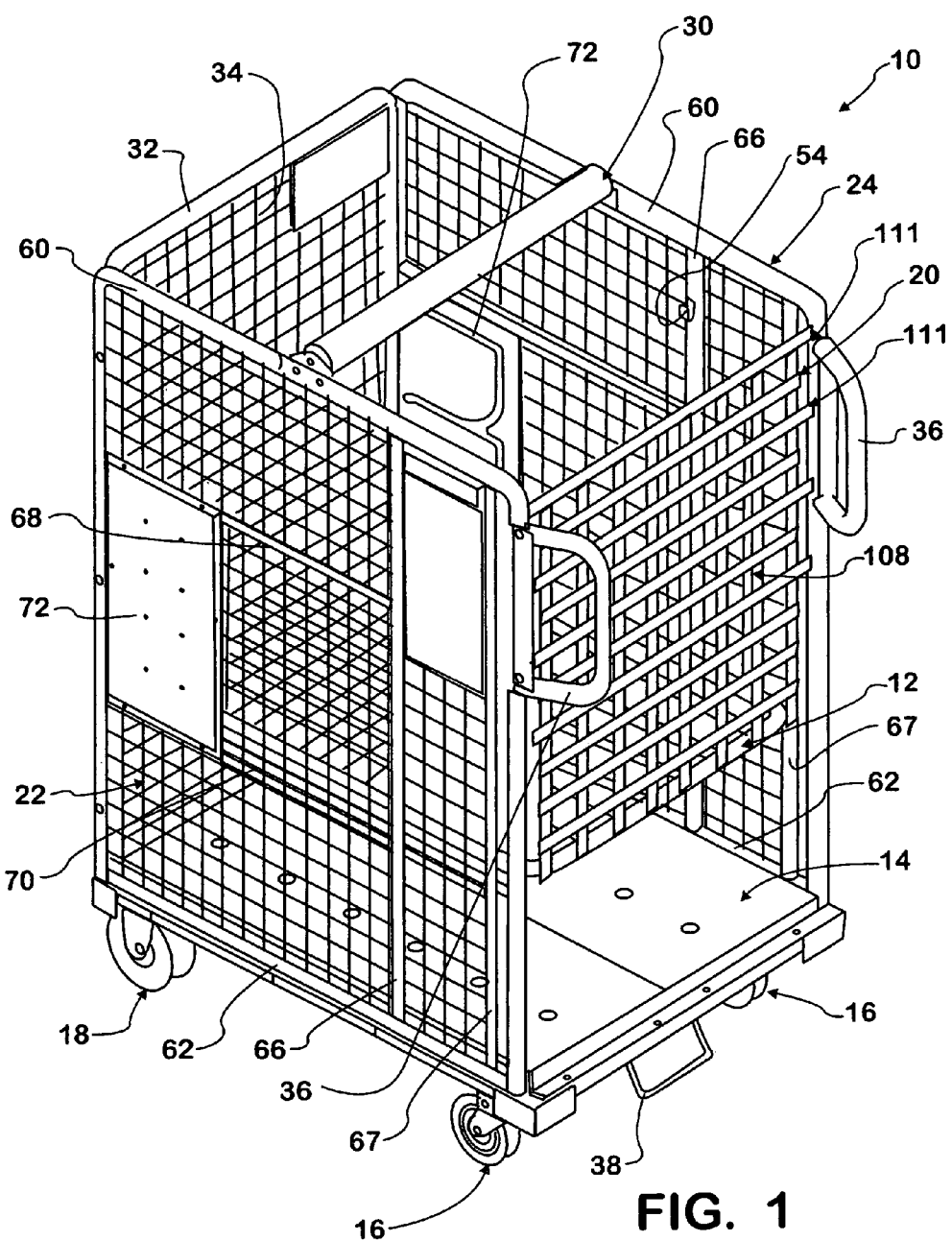
FIG. 1 is a perspective view of a first embodiment of a cabinet and shelf of the present invention, in the form of a wheeled cart.

Referring to FIG. 1, a container or cabinet, in this instance in the form of a cart 10, is shown and has therein at least one or more adjustable shelves 12, both of the present invention. The cart 10, has a bottom 14 supported on a set of casters 16 which are steerable and casters 18 (only one visible in FIG. 1) which are not steerable but fixed to the bottom 14. The container or cabinet portion of the cart 10 comprises the bottom 14, a front 20, a right side 22, a left side 24 and a rear or back 26. In this instance, the cart 10 has a generally open top, but a closed top could easily be provided and still fall within the present invention. In fact it is disclosed below to use one of the shelves to close the top. To add rigidity, the two sides 22 and 24 are joined at the top by a cross bar 30. The container portion of the cart 10 is of a tubular frame, typically 32 (FIG. 1), and wire mesh, typically 34 (FIG. 2), construction. To assist in maneuvering the cart 10, a pair of handles 36 is provided. To help retain the contents in the cart 10, the side 20 can be in the form of a door or gate which can be a removable cargo net 108 that attaches to the front 20 of the cart 10 and can be placed at one of four height locations. As disclosed below one of the shelves can be used to further close this side. To facilitate this multiple position placement, the cart 10 and the cargo net 108 have cooperating fasteners, 109 on the cargo net and 111 on the cart, such as studs and clips to retain the cargo net 108 to the cart 10. The cart 10 is also provided with a step or pedal 38 for operating a position lock or brake. The pedal 38 has a simple, conventional action, push down to lock the cart 10 in place, and lift with foot to release the lock. Referring to FIGS. 2, 3 and 4, the right side 22 (the left side 24 being a mirror image) and front 20 elevation and bottom 14 of the cart 10 are respectively shown.

Figure 6:
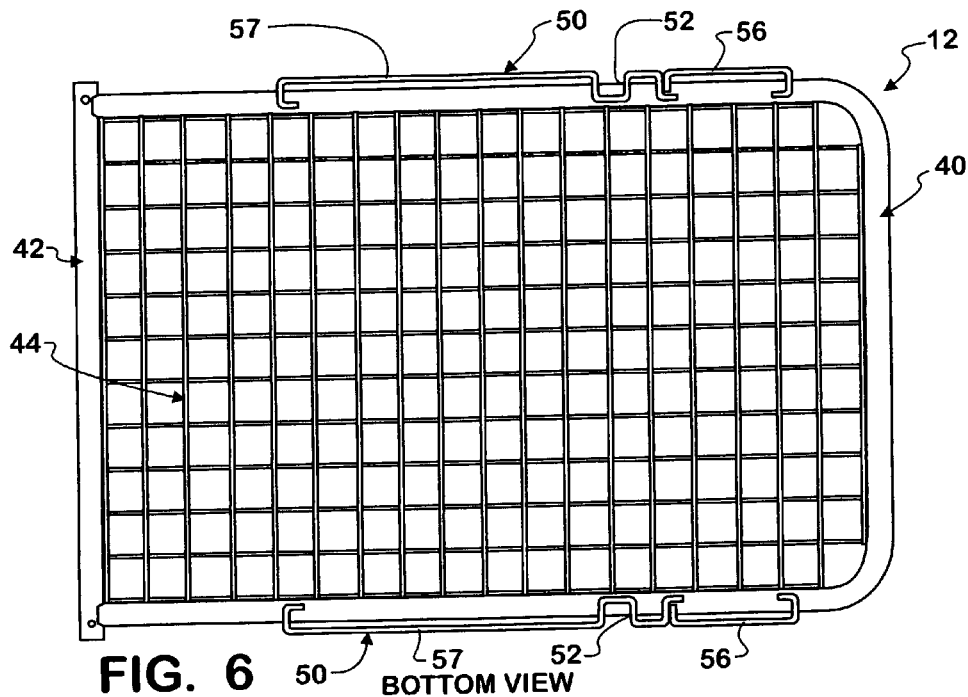
FIG. 6 is an enlarged top or plan view of the shelf shown in FIG. 5.
Figure 7:
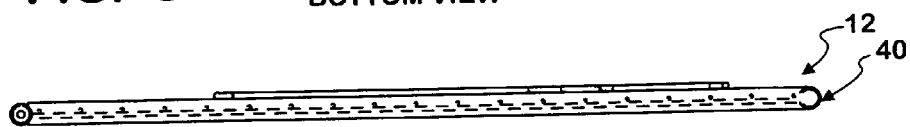
FIG. 7 is an elevational view of the shelf shown in FIG. 6.
Figure 5:
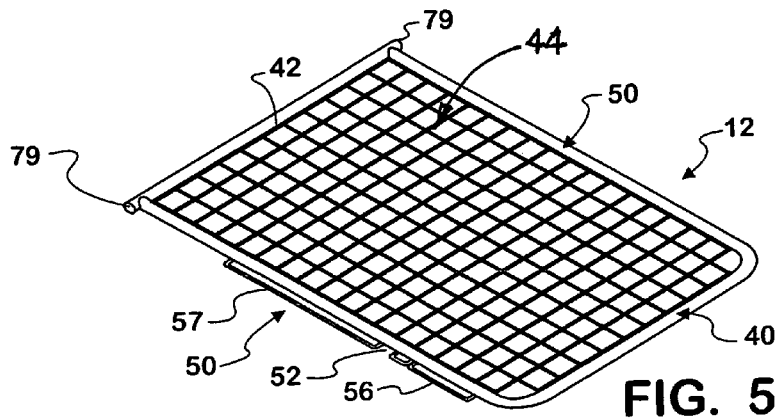
FIG. 5 is a perspective view of the shelf shown in FIG. 1.

Referring to FIGS. 5, 6 and 7, the details of the shelf 12 are shown. The shelf 12 has a tubular perimeter frame made up of a "U"-shaped tube 40 and at the "U" open end a straight tube 42 which is joined, as by welding, near to the ends of the "U. Wire mesh 44 forms the surface of the shelf 12. Of course, a solid surface could be provided instead of mesh. The ends 79 of the straight tube 42 will be provided with guide, roller, or wheel means 46 (FIG. 27) for operating on or in the tracks 48, as disclosed below. Along the sides of the shelf 12, guide rails 50, which can be formed of solid rod or wire, are provided. The rod or wire forming the guide rails 50 is welded to the tubular frame 40 and has a clearance notch 52 formed therein to permit passage of the shelf holding or hook means 54, subsequently described. Note, in this instance, four vertically spaced apart hooks 54 are provided on each side. The notch 52 is formed between the front portion 56 and rear portion 57 of each guide rail 50. Referring to FIGS. 9 to 15, the left side 22 is shown in more detail. Again, the frame thereof is formed of a "U" shaped tube 60 and a lower straight tube 62 welded thereto and enclosed or covered therebetween with mesh. At the upper, outside, front end of side 22 a plate 64 is provided for placement of warning labels or recommendation information. To reinforce the side 22 and carry the vertical load of the close end of the shelf 12, a vertical tube or bar 66 is provided and is welded at the top to tube 60 and at the bottom to straight tube 62. A similar but smaller vertical tube or bar 67 is provided adjacent the handles 36. Between the bar 66 and rear side of the tube 60, two horizontal reinforcements 68 and 70 are provided. To assist in moving the shelf 12 vertically up or down on each side, a track plate 72 is provided. In this instance, the track plate 72 has provisions for three level positions, upper 74, middle or intermediate 76 and lower 78, with interconnecting sections 80 and 82. Of course, more or fewer level positions could be provided. The track 48 will be further described below. In the present instance, the track 48 is formed by laser through-cutting the path 48 into, say, the aluminum or steel plate 72. As shown the track 48 at each of its positions has a downwardly inclined portion 84, so that the shelf 12 will stay by gravity in that position, unless moved as described below. The tracks 48 carry the weight of the far or inaccessible end of the shelf 12.

As shown in FIG. 11, each vertical bar 66 carries a plurality of mounting means 86 for the adjacent end of the shelf 12. In this instance, the mounting means 86 is in the form of a hook 54 (at least one on each side and, in this instance, a plurality) secured, as by welding, to the bar 66. Of course, it could be held by other fastening means such as screws or bolts and nuts. These hooks 54 are also shown protruding in FIGS. 10, 12 and 14. FIG. 13 shows a detail of a flange screw used to secure a cargo net 108 to side frames. FIG. 14 shows the orientation of the ½ inch tube and wire grid on side frames. The mounting means or hooks 54 also function as fulcrum points for helping in leveraging or pivoting of the shelf 12 to a higher or lower position.

Now FIGS. 9-15 show the left side 22, while FIGS. 16 to 23 show the right side 24, which is generally a mirror image of the left side 22, having similar tracks 48 and track plates 72 and similar mounting or hook means (also fulcrums) 54.

Figure 24:
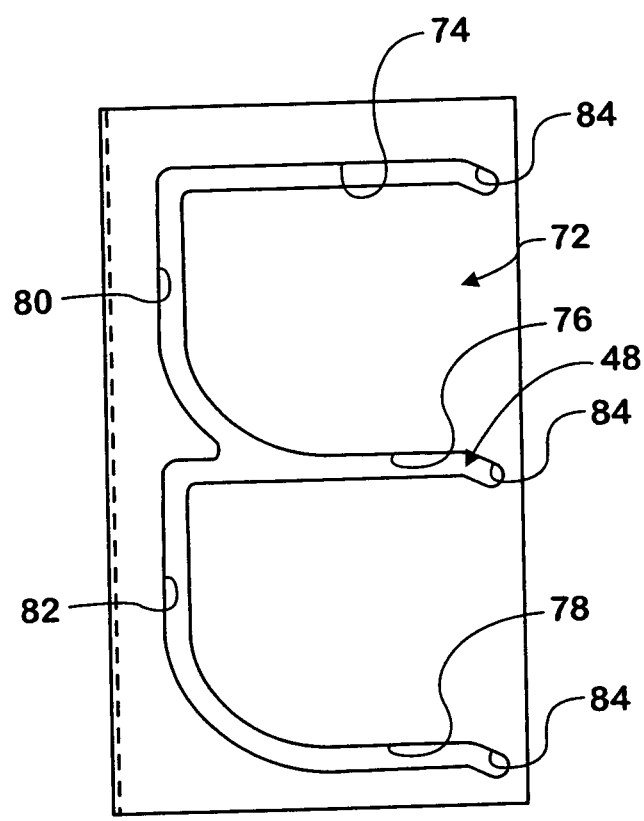
FIGS. 24 and 25 are enlarged views of the left and right sides of the element forming the tracks for the present invention.
Figure 25:
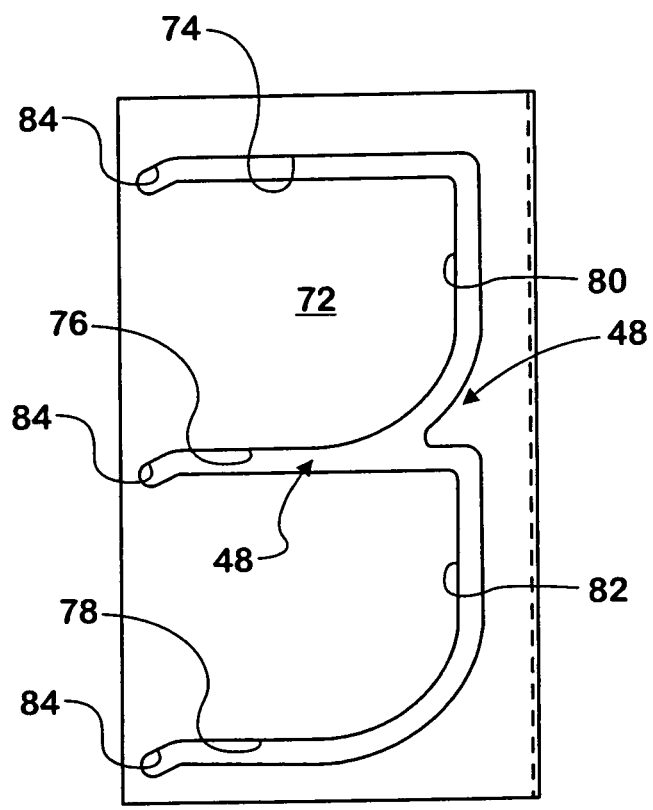

Referring to FIGS. 24 and 25, enlarged versions of the laser cut tracks 48 are shown. The laser cut track 48 is open and formed in the aluminum or steel plate 72. The track, in this instance, has three levels 74, 76 and 78 with a lower rest positions 84 and generally curved transition sections 80 and 82 between the positions.

Figure 26:
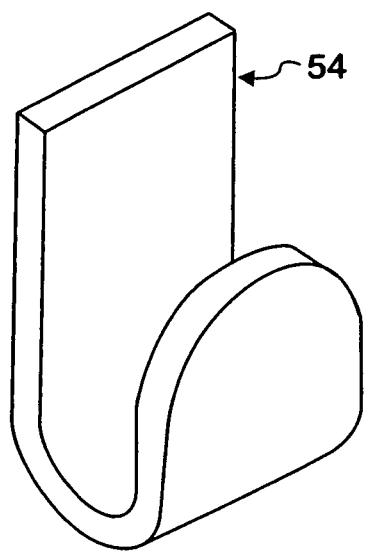
FIG. 26 is a greatly enlarged perspective view of one of the hooks or stirrups for supporting the accessible or close end of the shelf on the two sides of the cabinet, which hook can be attached to the respective right and left sides.

Referring to FIG. 26, the hook and fulcrum 54 is shown and would be secured, as by welding, to the bars 66, the open end of the hooks facing up and toward each other and arranged in pairs on the same horizontal level. The hook 54 is sized to pass through the notch 52, but otherwise can engage the guide rails 50 and acts to hold the near end of the shelf 12 at the desired level, and also acts as a fulcrum to help leverage the far end of the shelf 12 up or down to the next level as desired.

Figure 27:
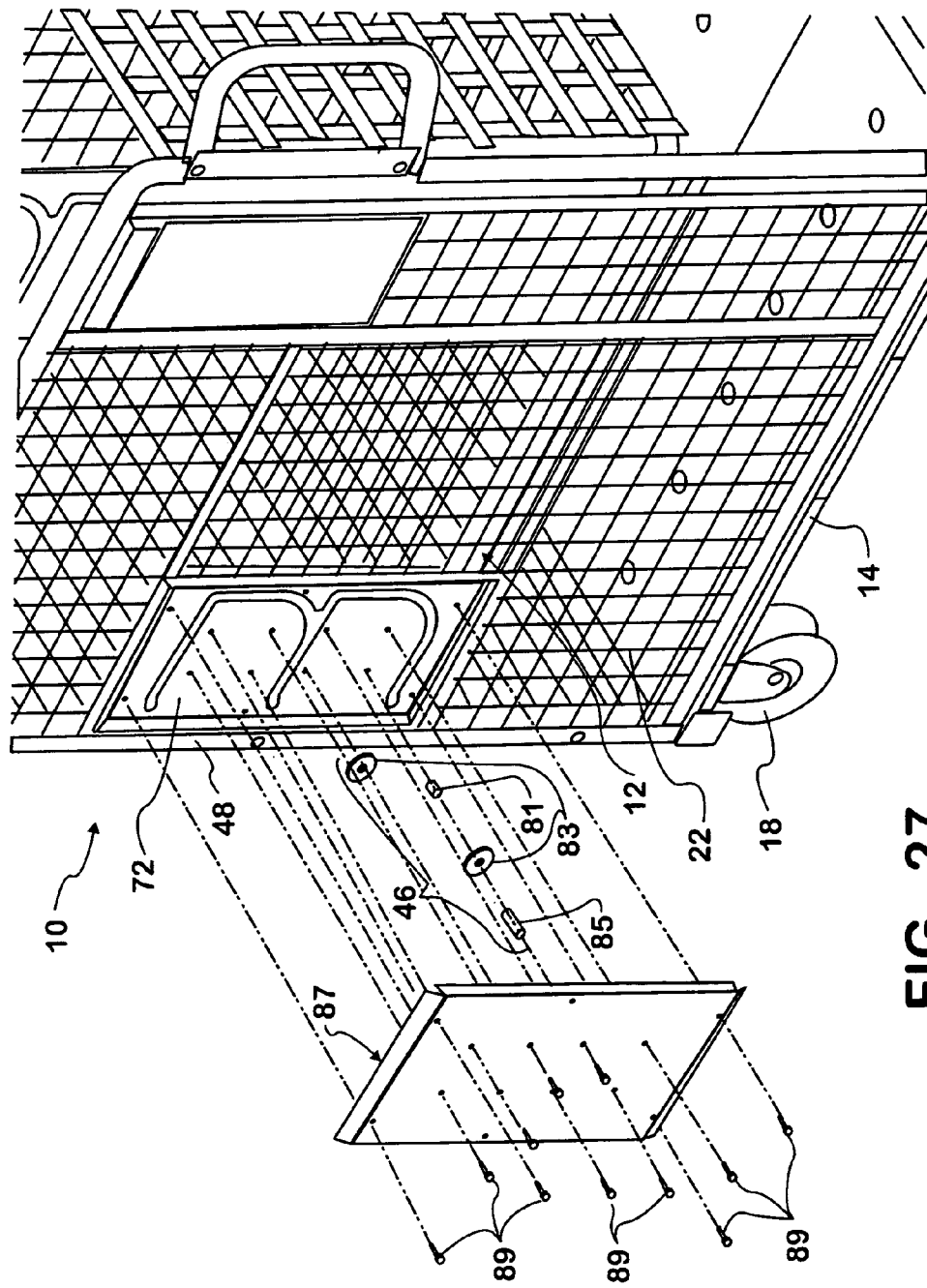
FIG. 27 shows how the right side track is assembled on the cart, with a roller which is carried by the right side, far end of the shelf.
Figure 28:
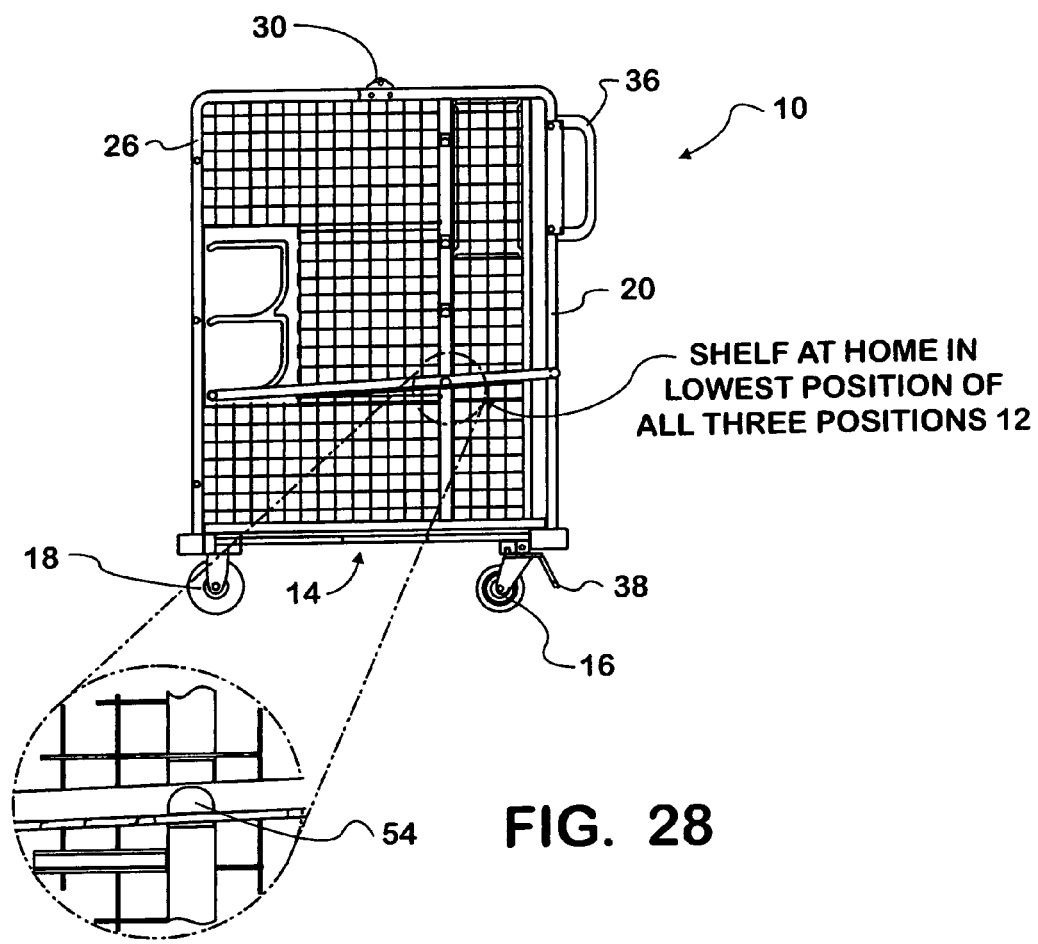
FIG. 28 and its enlarged detail, through FIG. 34 and its detail, are elevational views showing how a shelf is maneuvered from a low position to a higher position; similar but reverse maneuvers being used to lower it.
Figure 29:
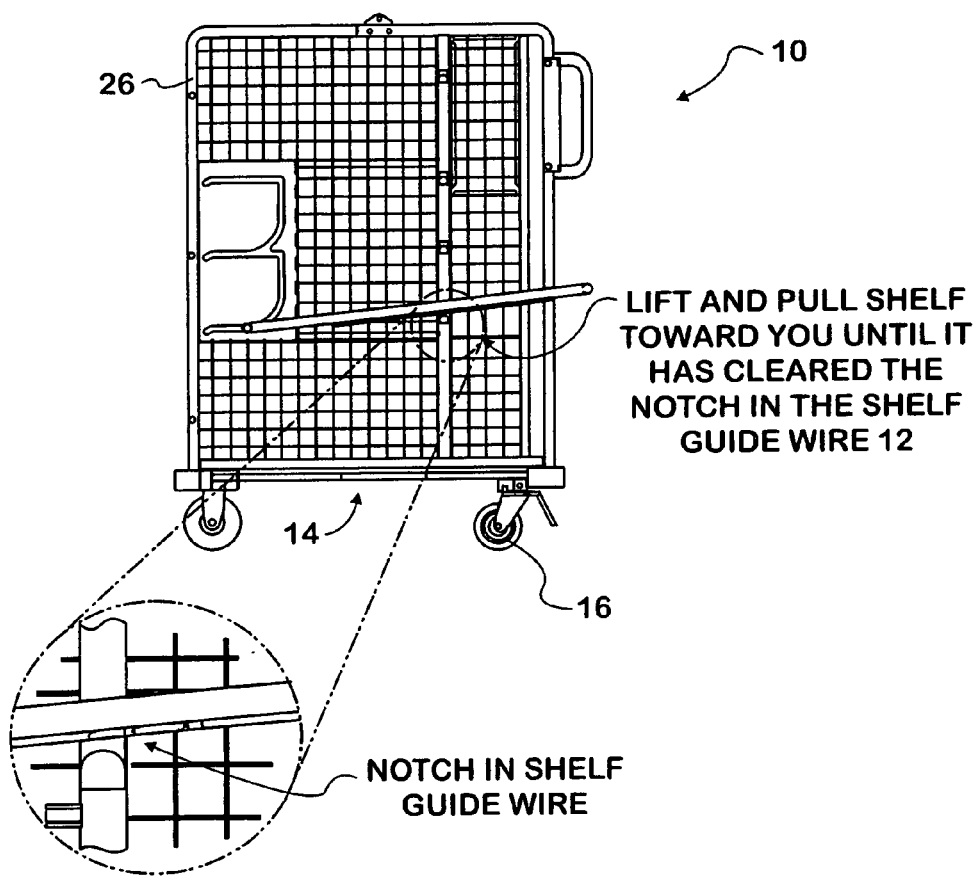
Figure 30:
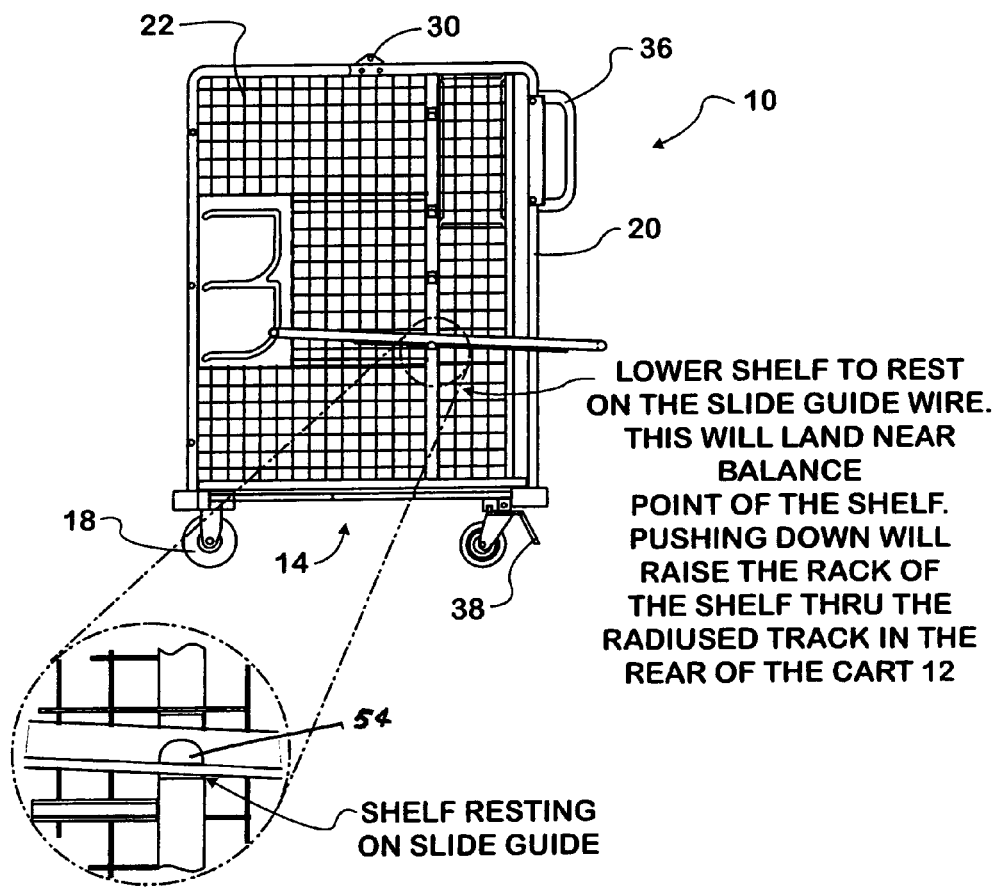
Figure 31:
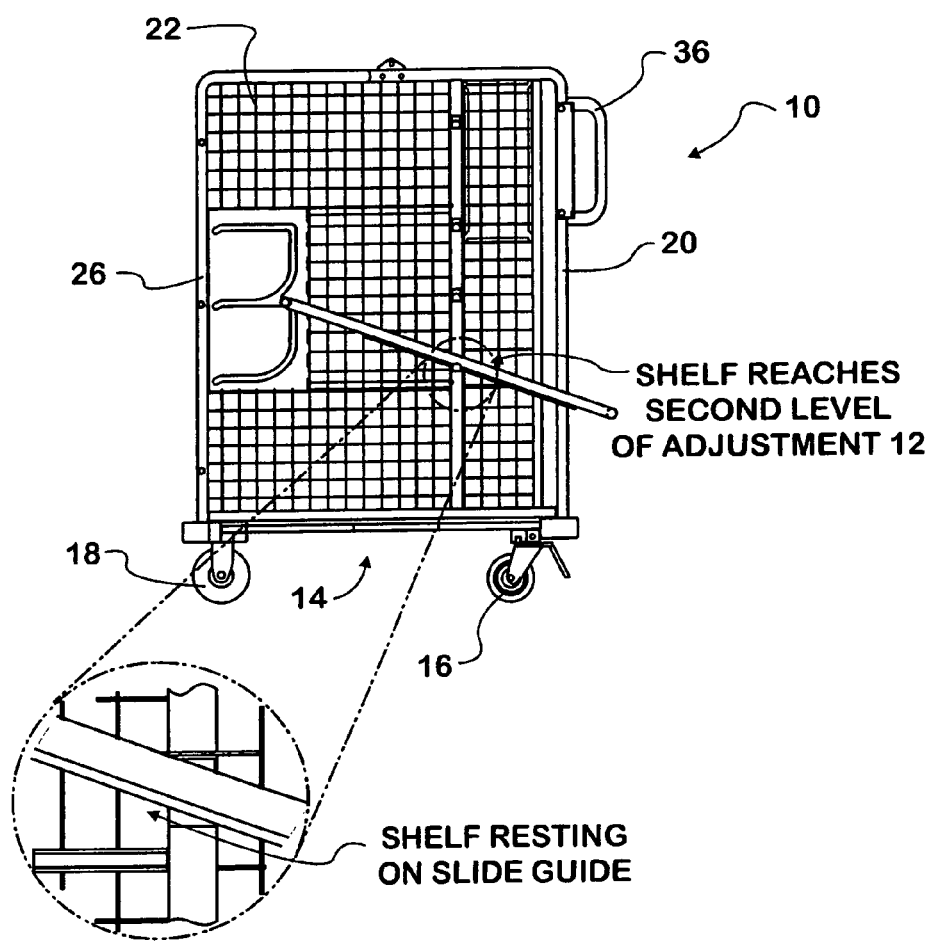
Figure 32:
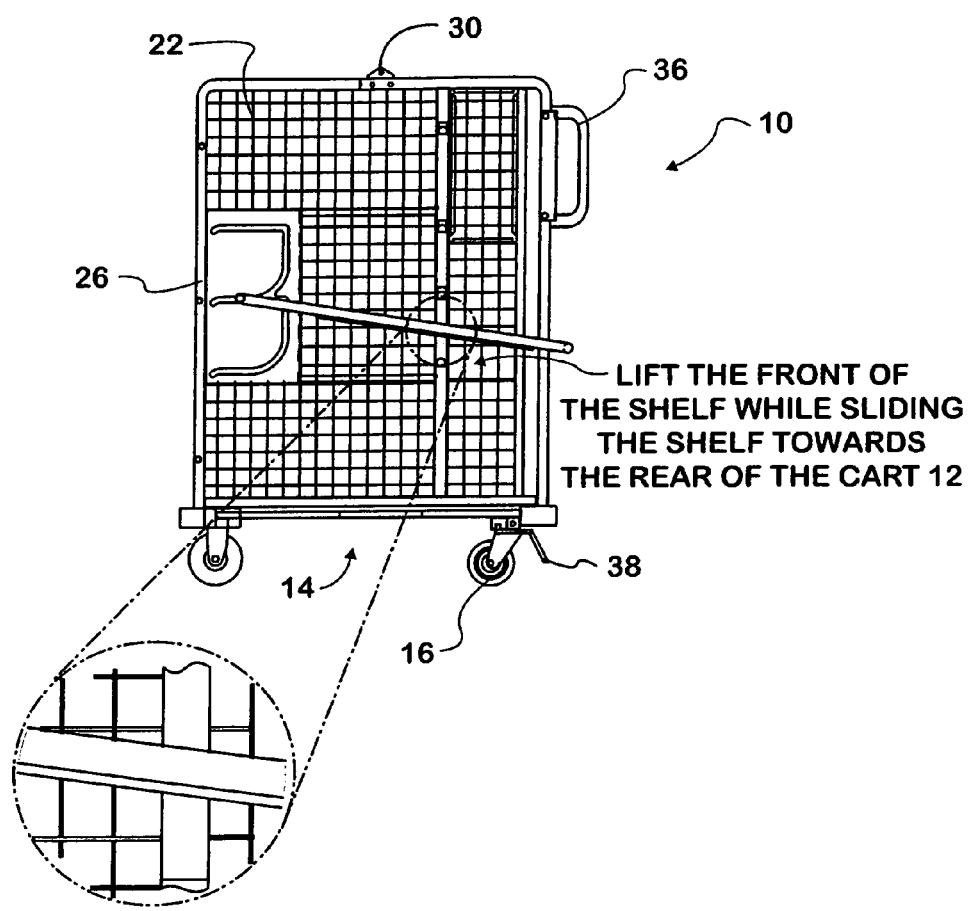
Figure 33:
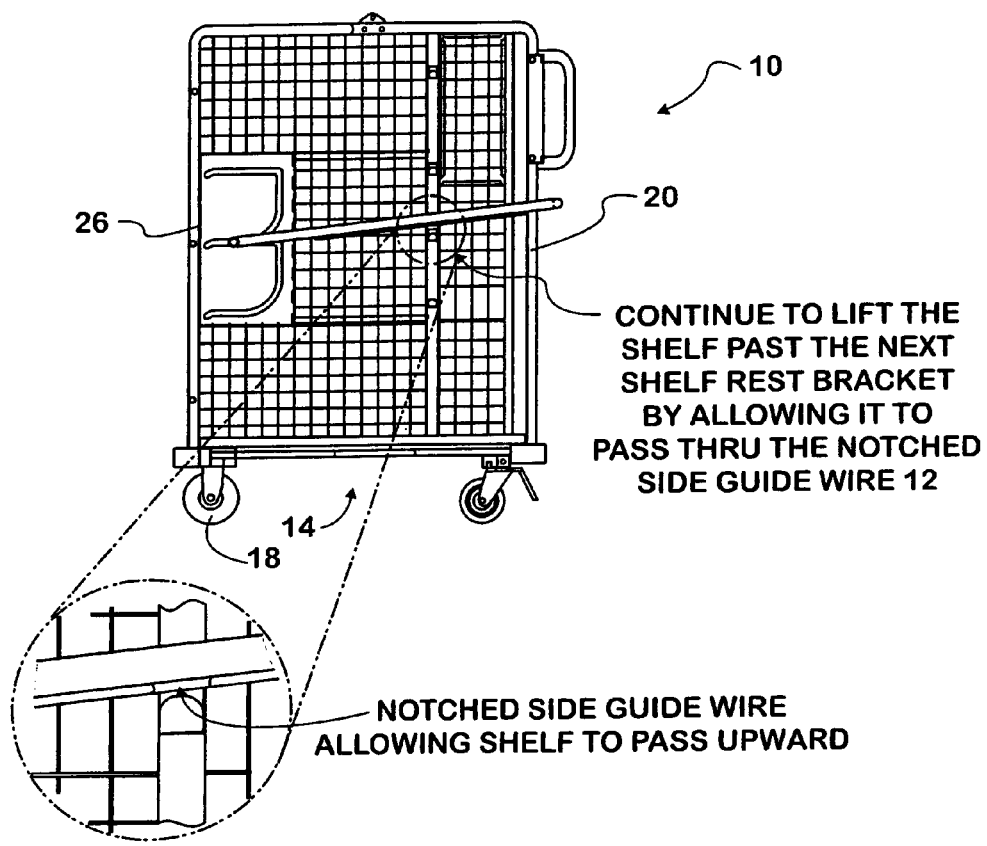
Figure 34:
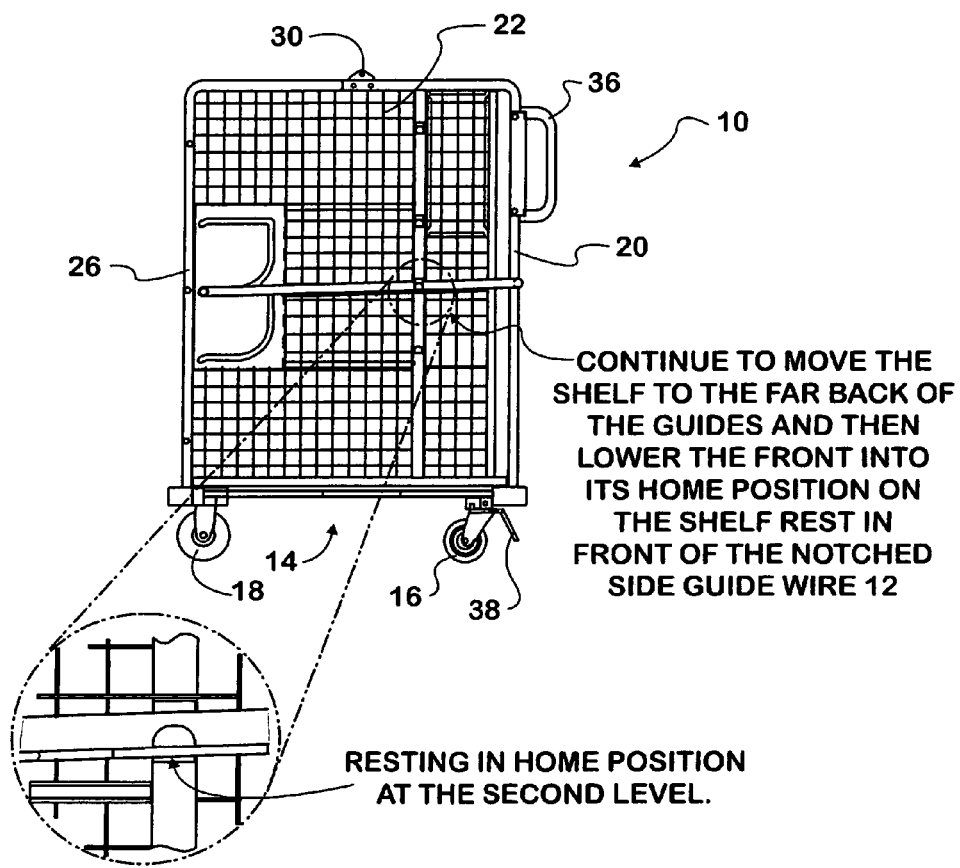

FIG. 27 shows the roller or wheel means 46 that ride in the two tracks 48 to guide the far end of the shelf 12 as it is maneuvered to a different level, either up or down, and includes a threaded bushing in the ends 79 of the tube 42, a roller 81, sandwiched between two washers or retainers 83, and an axle bolt 85. If desired, cover plate 87 held on by screws 89 can be provided to cover the outsides of the track 48, with the screws 89 going into openings in the track plate 72.

FIGS. 28 through 34 show the transitions and steps in moving the shelf 12 from a lower, in this instance its lowest position 78, to a higher, in this instance intermediate or middle position 76. Similar steps would be used to move the shelf 12 from the middle position 76 to the highest or upper position 74. Reversing the steps or process, going from FIG. 34 back, in order, to FIG. 28 would lower the shelf 12, either from its highest or upper position 74 to middle position 76, or from middle position 76 to its lowest position 78.

Figure 35:
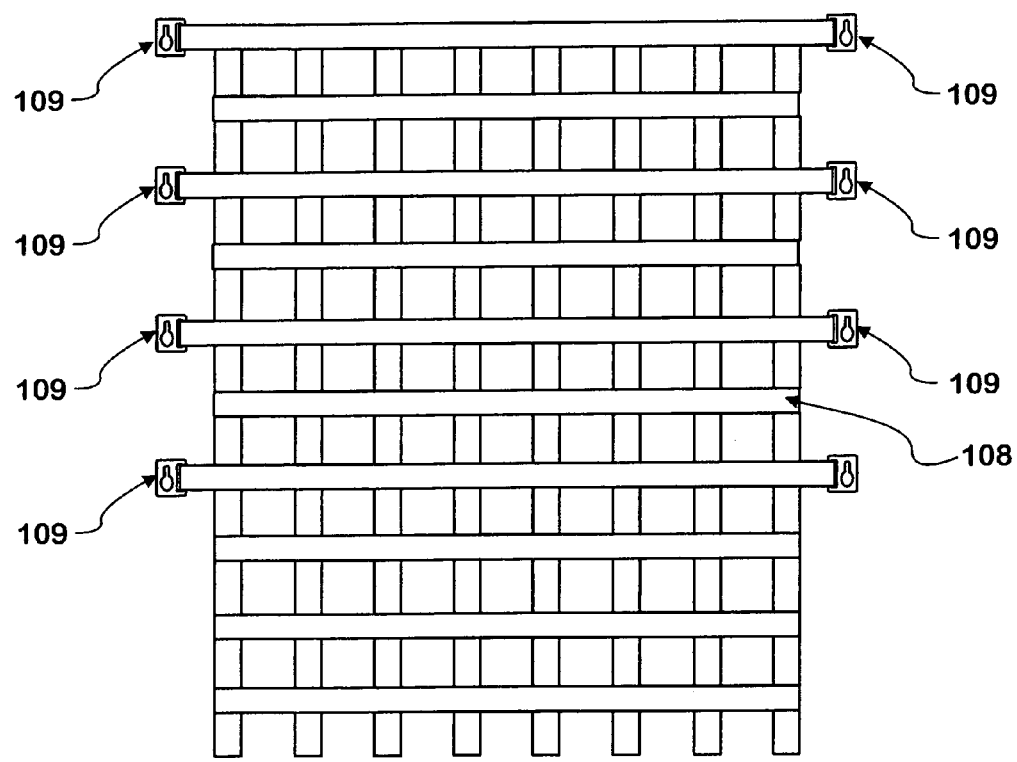
FIG. 35 is an enlarged drawing of the cargo net door or gate attached to the front side of the cart.

The front 20 of the cart 10 is where the cargo net 108, as shown in FIG. 35, is attached. The cargo net 108 does not cover the entire height of cart 10 as it is only intended to secure items placed on the adjustable shelf 12. It affixes to cart side frames from the flange screws shown in FIG. 13.

Figure 36:
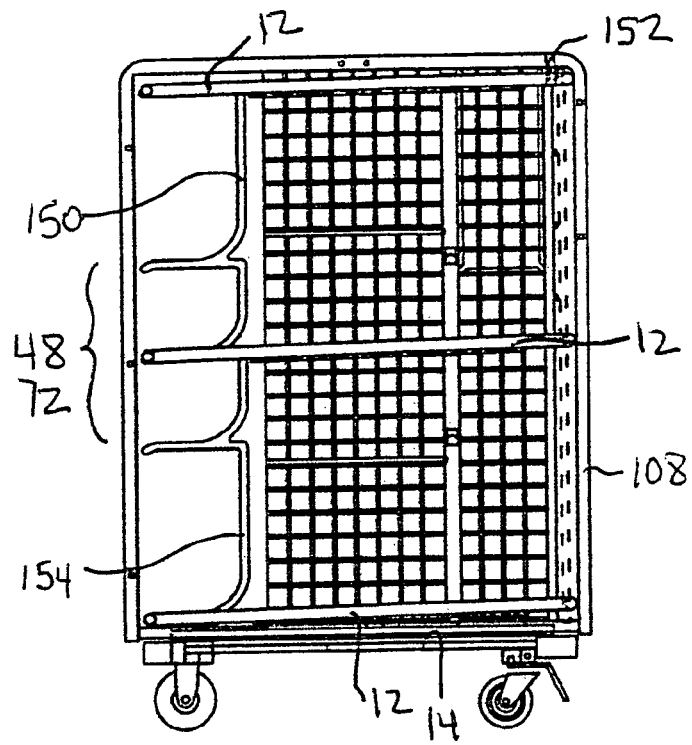
FIG. 36 is a cross sectional view through a secondary embodiment of the cart showing downwardly extended track means for allowing one shelf to rest closely adjacent a bottom surface of the cart to and showing upwardly extended track means for allowing one shelf to rest adjacent a top of said cart to close the same and to be fixed thereto in a locking manner.

Turning to FIG. 36, it will be seen that the original track 48 and track plate 72 of the track means can be extended vertically, both upwardly and downwardly. In the upwardly extended direction, an elongate curved transition section 150 extends upwardly from the top of the original track 48 to a position substantially adjacent a top surface of the cart 10. The far end of one (top) adjustable shelf 12 may be guided via this section 150 to a position adjacent the open top of the cart and the front or near end of the shelf 12 may be fixed to the framework such as the right side 22 and/or the left side 24 by any suitable releasable locking means 152, to create a locked, covered top for the cart 10 to keep the contents thereof from being accessible to potential pilfering of the contents. The releasable locking means 152 may take any suitable form, such as a hasp lock 152 which can be locked during transport and released when access to content of the interior of the cart 10 is desired.

Also, if desired, a second adjustable shelf 12 many be guided downwardly from the original track 48 via a curved transition section 154 to position the shelf 12 interiorly adjacent the bottom 14 of the cart 10. With only these two adjustable shelves positioned top and bottom, the entire interior area of the cart 10 is open for use in transporting, for example, very large items which would require the entire height of the cart 10 for accommodation. Alternatively, it is also possible to position at least one adjustable shelf 12 at a position intermediate the top and bottom in conjunction with the covered top and bottom positioned shelf, to create vertical division(s) within the cart 10, as desired. If the cart has but one shelf, it could be placed adjacent the bottom to provide a maximum depth cart for large articles, or in an upper position if a shelf is desired.

Figure 37:
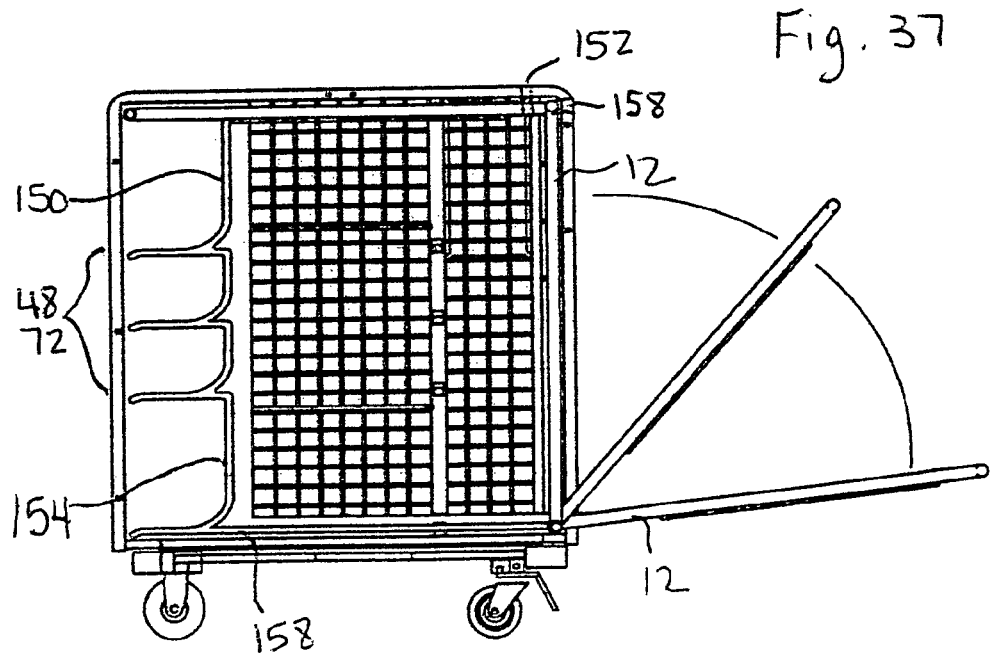
FIG. 37 is a cross sectional view similar to that of FIG. 36 and shows the downwardly extended track means further allowing the vertical positioning of a shelf across a front area of the cart to close the same and be fixed thereto in a locking manner.

Further, referring to FIG. 37, the lower transition 154 may lead to a horizontal bottom track section 156 extending to the open front 20 of the cart 10. With this track embodiment, the adjustable track 12 lying adjacent the interior of the bottom 14 may be pulled forward along the track section 156, may be vertically inclined as shown, and can serve as a secure cover for the front of the cart 10. Again, this vertically inclined shelf may be fixed to the right side 22 and/or left side 24 by releasable locking means 158. With the upper shelf 12 locked in place across the top and the vertically disposed bottom shelf locked over the front of the cart 10, access to the interior of the cart 10 is again restricted, as desired. Also, provision of an intermediate adjustable shelf 12 in this embodiment is also possible. It should be noted that the top security shelf and the vertical security shelf just described could also be locked to each other by a single locking means or to the cart structure.

While preferred embodiments have been illustrated and described, it should be understood that equivalent elements and steps of those called for in the attached claims in the present application, will fall within the scope of such claims.

What is claimed is:

1. A method for adjusting a shelf in a cabinet, having access to the shelf at only one end thereof, said cabinet having track means for guiding a far other end of said shelf from one level to another level, comprising the steps of:
   providing track means in the form of flat plates;
   forming at least one slot into each of said flat plates to form a said track,
   providing said flat plates on opposite sides of said cabinet, securing said flat plates to said opposite sides of said cabinet;

providing means on said shelf extending into each of said flat plates and extending into said slot on each flat plate;
guiding and supporting the far other end of said shelf with said means on said shelf resting in said slots in said flat plates;
freeing the adjacent one end of the shelf,
maneuvering the one end of the shelf from the one level to another level, while causing moving of the far other end of said shelf on said track means in said slots in said flat plates to said another level.

2. The method of claim 1, further including the step of:
fixing the adjacent one end of the shelf into desired position after moving the far other end of said shelf to said another level.

3. The method of claim 2, wherein said cabinet has wheels, a door or gate, and a fulcrum, comprising the steps of:
opening the door or gate to obtain access to the one end of said shelf;
pivoting said shelf on a said fulcrum on the cabinet,
maneuvering the shelf from one level to another,
securing the adjacent one end of the shelf in a different position,
after maneuvering, closing said door or gate, and
moving the cart on said wheels from one position to another position.

4. The method of claim 2, further including the step of:
securing the adjacent one end of the shelf in said another level.

5. The method of claim 4, comprising the steps:
of mounting said cabinet on wheels to form a cart, and
moving the cart on said wheels.

6. The method of claim 1, further including the step of:
securing the adjacent one end of the shelf in said another level.

7. The method of claim 1, further comprising the steps of:
providing said cabinet with two shelves and track means for guiding the other end of each of the two shelves from their present levels to two other levels,
freeing the adjacent end of one of said shelves,
maneuvering the one end of the shelf from one level to another level, while causing moving of the far other end of said shelf to another level,
freeing the adjacent end of the other of said shelves, and
maneuvering the one end of the other shelf from its present level to another level different from the level of the one shelf, while causing moving of the far other end of said other shelf to another level different from the level of the one shelf.

8. The method of claim 7, comprising the steps of:
providing said cabinet with a door or gate, and
opening the door or gate to obtain access to the one ends of said one shelf and said other shelf.

9. The method of claim 7, comprising the steps of:
providing shelf fulcrum for said cabinet shelf,
pivoting on one fulcrum the one shelf from one level to another level, and
pivoting on another fulcrum the other shelf from its present level to another level different from the level the one shelf is on.

10. The method of claim 9, comprising the steps of:
providing said cabinet with a door or gate,
opening the door or gate,
accessing the one end of the one shelf and of the other shelf, and
after maneuvering one or more of the one or another shelves,
closing the door or gate.

11. The method of claim 10, comprising the steps of:
mounting said cabinet on wheels to form a cart, and
moving the cart on said wheels.

12. The method of claim 7, comprising the steps of:
mounting said cabinet on wheels to form a cart, and
moving the cart on said wheels.

13. The method of claim 7, further comprising the steps of:
providing track means having at least three levels and one less shelf than levels,
slotting said flat plate to provide inclined portions of said slots at all of said levels,
providing said cabinet with a door or gate,
opening the door or gate,
accessing the far end of one of the shelves,
providing two shelf fulcrums for each level for moving the shelves,
pivoting one of the shelves on two of the fulcrums from one level to different level,
after maneuvering one or more of the shelves to the different levels,
closing the door or gate,
mounting said cabinet on wheels to form a cart,
moving the cart on said wheels,
providing track means to locate one of the shelves just above the bottom of the cabinet,
moving one of the shelves to adjacent the bottom of the cabinet to provide a maximum depth of the cabinet for use,
providing track means to locate one of shelves at the top of the cabinet,
moving one of the shelves on said track means to the top of said cabinet to close the top of the cabinet,
locking the shelf at the top to close the top,
moving said far side of one of the shelves over one of the inclined portion of the slots to change levels,
providing round ends of said far ends of the shelves smaller in diameter than the width of said slots,
forming said round ends with shafts extending out from said far ends of the shelves,
engaging said round ends on the shelves in said slots,
providing rollers or bearings on the shafts and engaging the rollers or bearings in said slots,
turning the rollers or bearings on the shafts when moving said far end of the shelves in the slots, and
enclosing said far ends of the shelves in said slots.

14. The method of claim 1, comprising the steps of:
providing said cabinet with a door or gate, and
opening the gate to obtain access to the one end of said shelf.

15. The method of claim 1, comprising the steps of:
providing a shelf fulcrum in said cabinet, and
pivoting the shelf on a fulcrum on the cabinet from one level to another.

16. The method of claim 15, the steps of:
providing said cabinet with a door or gate,
opening the door or gate,
accessing the one end of the shelf,
maneuvering said shelf from one level to another level, and
after maneuvering, closing said door or gate.

17. The method of claim 1, comprising the steps of:
mounting said cabinet on wheels to form a cart, and
moving the cart on said wheels.

18. The method as in claim 1, comprising the further step of slidably retaining said shelf in said cabinet.

19. The method of claim 1, further including the steps of:
providing said cabinet with two shelves and track means for guiding the other end of each of the two shelves from their present levels to two other levels,
providing said cabinet with a door or gate, and
opening the door or gate to obtain access to the one end of said shelf,
providing a shelf fulcrum in said cabinet,
freeing the adjacent end of one of said shelves,
pivoting the shelf on a fulcrum in the cabinet from one level to another,
maneuvering the one end of the shelf from one level to another level while causing moving of the far other end of said shelf to another level,
freeing the adjacent end of the other of said shelves, and
maneuvering the one end of the other shelf from its present level to another level different from the level of the one shelf while causing moving of the far other end of said other shelf to another level different from the level of the one shelf.

20. The method of claim 19, further including the steps of:
providing said cabinet with a door or gate,
maneuvering said shelf from one level to another level, and
after maneuvering, closing said door or gate.

21. The method of claim 19, comprising the steps of:
mounting said cabinet on wheels to form a cart, and
moving the cart on said wheels.

22. The method of claim 1, the cabinet having an access opening adjacent said one end of said shelf, comprising the step of:
providing at least two shelves in said cabinet,
providing track means to position one of said at least two shelves at the top of the cabinet, and
providing track means to position the other of said at least two shelves adjacent to the access opening of the cabinet,
closing the top of said cabinet with said one shelf, and
closing the access opening of the cart with the other shelf, whereby the cabinet interior can be secured with the two shelves.

23. The method of claim 1, comprising the steps of:
providing track means to locate said shelf just above the bottom of the cabinet, and
moving the shelf to just above the bottom of the cabinet to provide a maximum depth of the cabinet for use.

24. The method of claim 1, comprising the steps of:
providing track means to locate said shelf at the top of said cabinet, and
moving said shelf on said track means to the top of said cabinet to close the top of the cabinet.

25. The method of claim 24, comprising the steps of:
providing track means to locate a second shelf at an access opening of said cabinet to close said access opening, and
maneuvering said second shelf to close said access opening.

26. The method of claim 1, comprising the steps of:
providing track means to locate said shelf at an access opening of said cabinet to close said access opening, and
moving said shelf to close said access opening.

27. The methods of any one of claims 24, 25 and 26, and locking said shelf to close one or more of said top and the access opening.

28. The method as in claim 1, comprising the steps of:
slotting said flat plate to provide an inclined lower position adjacent an end of said slot at least one of said one level and said another level, and
moving said far side of said shelf over said inclined portion of said slot to change between the one level to the another level, or the another level to the one level.

29. The method as in claim 28, comprising the steps of:
moving the far end of said shelf up said inclined portion to move the shelf from one of said one level and another level, and
moving the far end of said shelf down said inclined portion to move the shelf to the other of said another level and one level.

30. The method of claim 28, comprising the steps of:
forming said round end with a shaft extending out from said far end of said shelf,
providing a roller or bearing on said shaft and engaging in said slot, and
turning said roller or bearing on said shaft when moving said far end of said shelf in said slot.

31. The method of claim 28, including the step of:
enclosing said far end of said shelf in said slot.

32. The method of claim 28, comprising the step of:
slotting said flat plate to provide the inclined portion of said slot at both said one level and said another level.

33. The method as in claim 28, comprising the steps of:
providing at least a third level, and slotting said flat plate to provide a third level.

34. The method as in claim 33, comprising the steps of:
providing at least two shelves, and
moving said two shelves into and out of said at least the one, another and third levels.

35. The method of claim 1, comprising the steps of:
providing a round end on said far end of said shelf smaller in diameter than the width of said slot, and
engaging said round end on said shelf in said slot.

\* \* \* \* \*

UNITED STATES PATENT AND TRADEMARK OFFICE
CERTIFICATE OF CORRECTION

PATENT NO.        : 8,764,031 B2
APPLICATION NO.   : 12/930556
DATED             : July 1, 2014
INVENTOR(S)       : Clemance Bernard Finstad, III, Merle Arvid Larson and Michael Piontek It is certified that error appears in the above-identified patent and that said Letters Patent is hereby corrected as shown below:

In the Claims

Column 7, line 54, "fulcrum" should be "fulcrums"

Signed and Sealed this
Twenty-eighth Day of October, 2014

Michelle K. Lee
*Deputy Director of the United States Patent and Trademark Office*